(12) United States Patent
Howard et al.

(10) Patent No.: US 6,584,505 B1
(45) Date of Patent: Jun. 24, 2003

(54) AUTHENTICATING ACCESS TO A NETWORK SERVER WITHOUT COMMUNICATING LOGIN INFORMATION THROUGH THE NETWORK SERVER

(75) Inventors: John Hal Howard, Redmond, WA (US); Jeffrey C. Kunins, Seattle, WA (US); Darren L. Anderson, Bellevue, WA (US); Ryan W. Battle, Seattle, WA (US); Max E. Metral, Boston, MA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/349,619

(22) Filed: Jul. 8, 1999

(51) Int. Cl.⁷ ............................................. G06F 15/170
(52) U.S. Cl. ........................ 709/225; 709/227; 709/229
(58) Field of Search ........................ 370/338; 380/244; 709/201, 225, 227, 229

(56) References Cited

U.S. PATENT DOCUMENTS

| | | |
|---|---|---|
| 5,586,260 A | 12/1996 | Hu |
| 5,590,199 A | 12/1996 | Krajewski, Jr. et al. |
| 5,649,099 A | 7/1997 | Theimer et al. |
| 5,684,950 A | 11/1997 | Dare et al. |
| 5,778,065 A | 7/1998 | Hauser et al. |
| 6,088,450 A | 7/2000 | Davis et al. |
| 6,105,131 A | 8/2000 | Carroll |
| 6,148,402 A | 11/2000 | Campbell |
| 6,189,103 B1 | 2/2001 | Nevarez et al. |
| 6,198,824 B1 | 3/2001 | Shambroom |
| 6,256,741 B1 | 7/2001 | Stubblebine |
| 6,263,432 B1 | 7/2001 | Sasmazel et al. |
| 6,278,705 B1 * | 8/2001 | Chau et al. .................. 370/338 |
| 6,279,111 B1 | 8/2001 | Jensenworth et al. |
| 6,292,895 B1 | 9/2001 | Baltzley |
| 6,301,658 B1 | 10/2001 | Koehler |
| 6,317,838 B1 * | 11/2001 | Baize .......................... 380/244 |
| 6,321,333 B1 | 11/2001 | Murray |
| 6,405,318 B1 | 6/2002 | Rowland |
| 2002/0002688 A1 * | 1/2002 | Gregg et al. ................. 709/201 |

OTHER PUBLICATIONS

Kohl et al., "The Kerberos Network Authentication Server (V5)," Network Working Group RFC 1510, www.CIC.ohio.edu, Sep. 1999 (retrieved at http://www.ietf.org/rfc/rfc1510.txt?number=1510).

* cited by examiner

Primary Examiner—Le Hien Luu
(74) Attorney, Agent, or Firm—Lee & Hayes, PLLC

(57) ABSTRACT

A system determines whether to grants access to a network server by a user. Initially, a user attempts to gain access to a network server, such as a web server. Prior to granting access to the network server, the network server authenticates the user by sending an authentication request to an authentication server. The authentication server determines whether the user was already authenticated by the authentication server. If the user was already authenticated by the authentication server, then the network server is notified that the user is authenticated. The network server then grants the user access to the network server. If the user was not already authenticated by the authentication server, then login information is retrieved from the user and compared to authentication information maintained by the authentication server. If the retrieved login information matches the authentication information, then the network server is notified that the user is authenticated. The retrieved login information and the authentication information is concealed from the network server. If the user is authenticated, then a user profile is communicated to the network server along with the notification that the user is authenticated. If the user is successfully authenticated, then a cookie is provided to an Internet browser operated by the user. The cookie contains information regarding user authentication, the user's profile, and a list of network servers previously visited by the user.

54 Claims, 6 Drawing Sheets

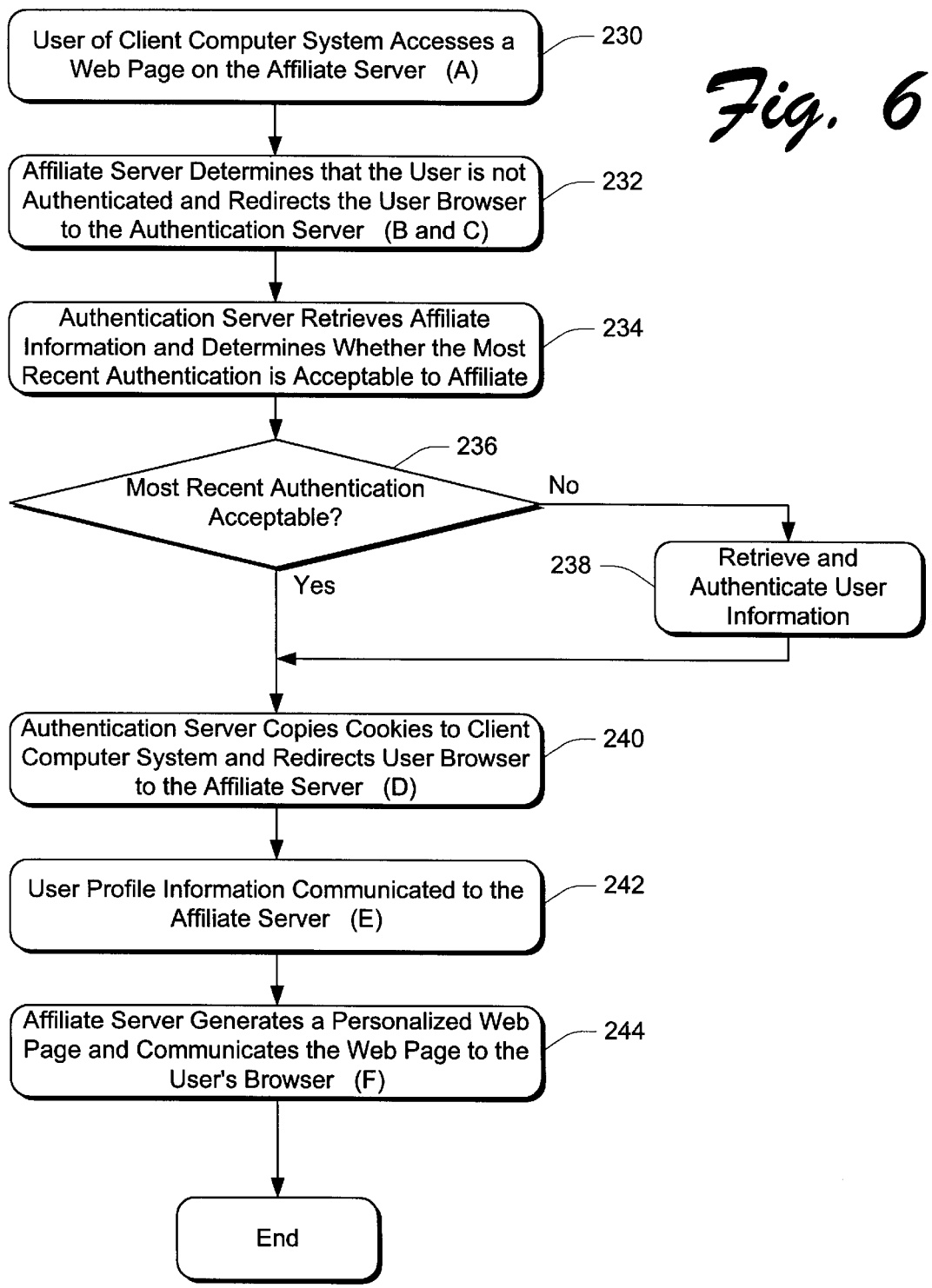

AUTHENTICATING ACCESS TO A NETWORK SERVER WITHOUT COMMUNICATING LOGIN INFORMATION THROUGH THE NETWORK SERVER

TECHNICAL FIELD

This invention relates to user authentication systems. More particularly, the invention relates to the authentication of a user through an authentication server prior to granting access to an affiliate server. The authentication system also provides a mechanism for the central storage of user profile information.

BACKGROUND OF THE INVENTION

The recent growth in popularity of the Internet has significantly increased the number of Internet users and the number of Internet sites (also referred to as "web sites"). Web sites may provide various types of information to users, offer products or services for sale, and provide games and other forms of entertainment. Many web sites require users to "register" by providing information about themselves before the web server grants access to the site. This registration information may include the user's name, account number, address, telephone number, email address, computer platform, age, gender, or hobbies. The registration information collected by the web site may be necessary to complete transactions (such as commercial or financial transactions). Additionally, information can be collected which allows the web site operator to learn about the visitors to the site to better target its future marketing activities or adjust the information provided on the web site. The collected information may also be used to allow the web site to contact the user directly (e.g., via email) in the future to announce, for example, special promotions, new products, or new features of the web site.

When registering with a web site for the first time, the web site typically requests that the user select a login ID and an associated password. The login ID allows the web site to identify the user and retrieve the user's information during subsequent user visits to the web site. Generally, the login ID must be unique to the web site such that no two users have the same login ID. The password associated with the login ID allows the web site to authenticate the user during subsequent visits to the web site. The password also prevents others (who do not know the password) from accessing the web site using the user's login ID. This password protection is particularly important if the web site stores private or confidential information about the user, such as financial information or medial records.

If a user visits several different web sites, each web site may require entry of similar registration information about the user, such as the user's name, mailing address, and email address. This repeated entry of identical data is tedious when visiting multiple web sites in a short period of time. Many web sites require the user to register before accessing any information provided on the web site. Thus, the user must enter the requested registration information before they can determine whether the site contains any information of interest.

After registering with multiple web sites, the user must remember the specific login ID and password used with each web site or other Internet service. Without the correct login ID and password, the user must re-enter the registration information. A particular user is likely to have different login IDs and associated passwords on different web sites. For example, a user named Bob Smith may select "smith" as his login ID for a particular site. If the site already has a user with a login ID of "smith" or requires a login ID of at least six characters, then the user must select a different login ID. After registering at numerous web sites, Bob Smith may have a collection of different login IDs, such as: smith, smith1, bmith, smithb, bobsmith, bob_smith, and smithbob. Further, different passwords may be associated with different login IDs due to differing password requirements of the different web sites (e.g., password length requirements or a requirement that each password include at least one numeric character). Thus, Bob Smith must maintain a list of web sites, login IDs, and associated passwords for all sites that he visits regularly.

SUMMARY OF THE INVENTION

The invention allows a web user to maintain a single login ID (and associated password) that provides access to multiple web servers or services. Once the user has logged into an authentication server, it is not necessary to re-enter the login ID or user information when accessing other affiliated web servers. The single login ID has an associated user profile that contains the registration information typically requested by web servers during a user registration process. The authentication server authenticates each login ID using the associated password. The individual web servers are not required to authenticate the individual users. Further, to protect the user's password, the individual web servers do not receive the user's password. Instead, the individual web servers receive an indication of whether the user is logged into the authentication server and how long since the user login ID was last authenticated by the authentication server. The web servers execute a code sequence that allows each web server to interact with the authentication server.

An implementation of the invention receives a request from a network server to authenticate a user who is attempting to gain access to the network server. The process determines whether the user was already authenticated by the authentication server. If the user was already authenticated, then the network server is notified that the user is authenticated. If the user was not already authenticated by the authentication server, then login information is retrieved from the user and compared to authentication information maintained by the authentication server. The network server is notified that the user is authenticated if the retrieved login information matches the authentication information.

Other aspects of the invention provide for the determination of an elapsed time since the last authentication of the user. If the elapsed time since the last authentication of the user exceeds a timeout period identified by the network server, then the authentication of the user is refreshed.

In the described implementation of the invention, the user's login information and the authentication information maintained by the authentication server is concealed from the network server.

In accordance with another aspect of the invention, a user profile is communicated to the network server when providing notice that the user is authenticated.

Another aspect of the invention provides a cookie to an Internet browser operated by the user if the retrieved login information matches the authentication information. The cookie may contain user profile information, user authentication information, or a list of network servers previously visited by the user.

BRIEF DESCRIPTION OF THE DRAWINGS

FIGS. 5 and 6 illustrate the interaction between the client computer system, a particular affiliate server and the authentication server in a different situation.

DETAILED DESCRIPTION

Figure 1:
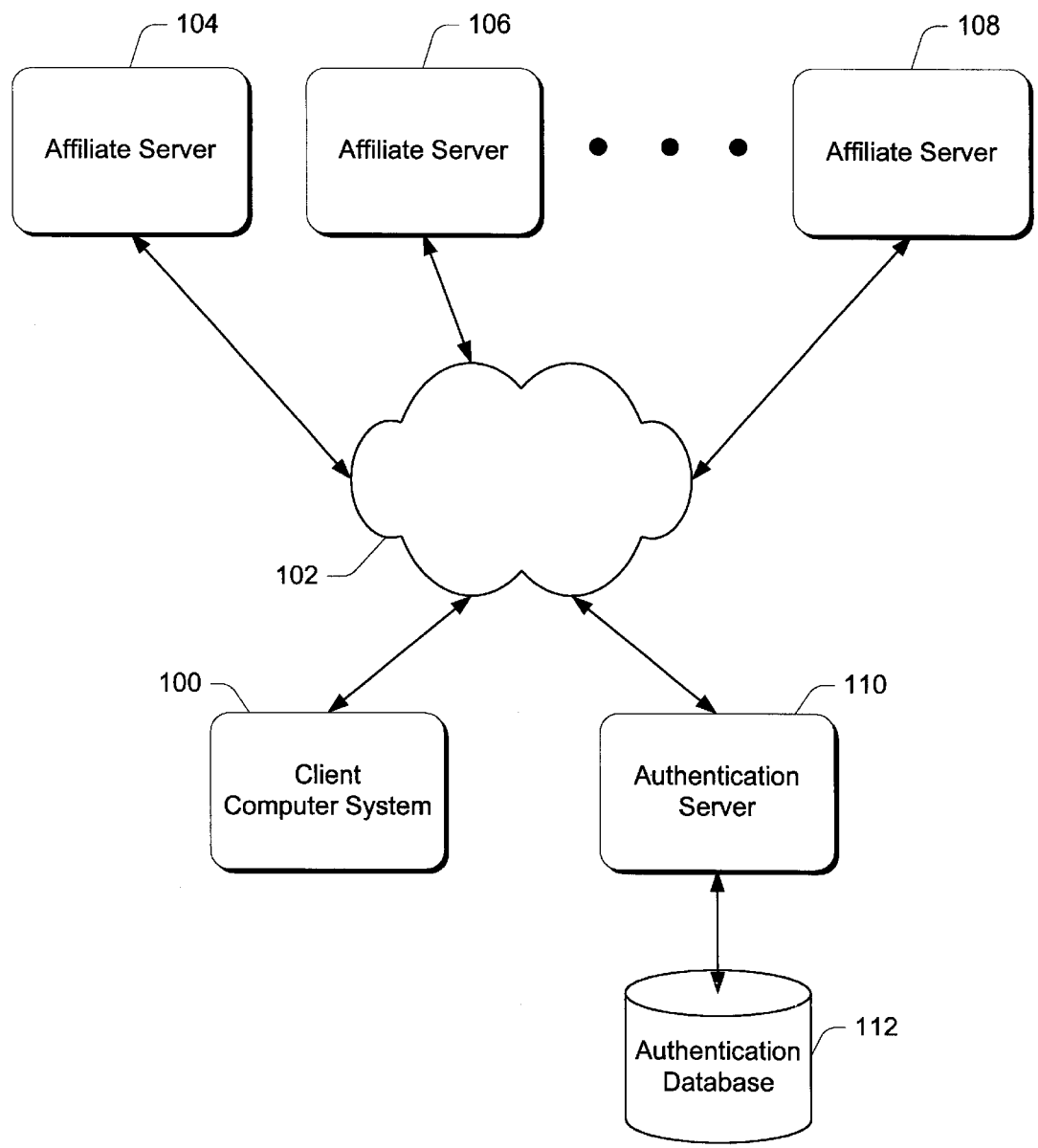
FIG. 1 illustrates an exemplary network environment in which the present invention is utilized.

FIG. 1 illustrates an exemplary network environment in which the present invention is utilized. A client computer system 100 is coupled to a network 102. In this example, network 102 is the Internet (or the World-Wide Web). However, the teachings of the present invention can be applied to any data communication network. Multiple affiliate servers 104, 106, and 108 are coupled to network 102, thereby allowing client computer system 100 to access web servers 104, 106, and 108 via the network. Affiliate servers 104, 106, and 108 are also referred to as "web servers" and "network servers". An authentication server 110 is also coupled to network 102, allowing communication between the authentication server and client computer system 100 and web servers 104, 106, and 108. Although referred to as an "authentication server", authentication server 110 is also a web server capable of interacting with web browsers and other web servers. In this example, data is communicated between the authentication server, client computer system, and web servers using the hypertext transfer protocol (http), a protocol commonly used on the Internet to exchange information.

An authentication database 112 is coupled to authentication server 110. The authentication database 112 contains information necessary to authenticate users and also identifies which elements of the user profile information should be provided to a particular affiliate server when the user accesses the affiliate server. Although the authentication database 112 is shown separately from the authentication server 110, in other embodiments of the invention, the authentication database is contained within the authentication server.

The authentication process, as described below, authenticates a user of client computer 100 seeking access to an affiliate server 104, 106, or 108. The authentication server 110 authenticates the user of client computer 100 by requesting authenticating information, such as the user's login ID and password. If the user is successfully authenticated, then authentication server 110 notifies the appropriate affiliate server that the user is authenticated. As part of the user authentication process, the authentication server 110 may provide certain user profile information to the affiliate server, such as the user's email address, user preferences, and the type of Internet browser installed on client computer 100. This user profile information is associated with the user's login ID so that each time the user logs into an affiliate server, the associated user profile information is available to provide to the affiliate server. This user profile allows the user to enter the information once and use that information during subsequent logins to new affiliate servers.

The term "affiliate server" is defined herein as a web server that has "registered" or otherwise established a relationship or affiliation with the authentication server 110. Each affiliate server 104, 106, and 108 includes a code sequence (not shown) that allows the affiliate server to communicate with the authentication server 110 when a user (who is also registered with the authentication server) requests access to the affiliate server. Additional details regarding the authentication process and the interaction between the client computer, the affiliate servers, and the authentication server are provided below.

Figure 2:
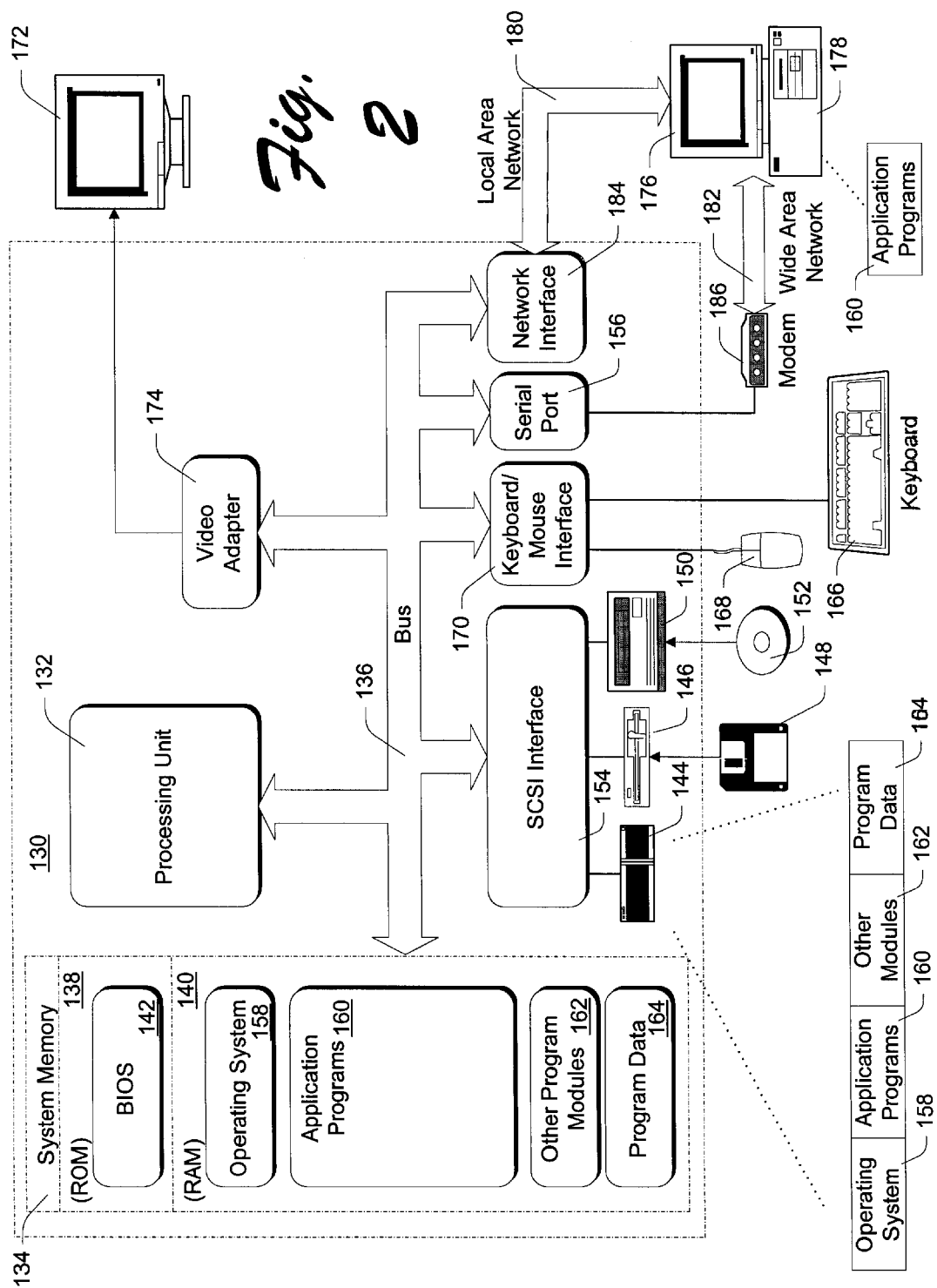
FIG. 2 is a block diagram showing pertinent components of a computer in accordance with the invention.

FIG. 2 shows a general example of a computer 130 that can be used with the present invention. A computer such as that shown in FIG. 2 can be used for client computer system 100, authentication server 110, or any of the affiliate servers 104, 106 or 108.

Computer 130 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within computer 130, such as during startup, is stored in ROM 138.

Computer 130 further includes a hard disk drive 144 for reading from and writing to a hard disk (not shown), a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate interface. The drives and their associated computer-readable media provide nonvolatile storage of computer-readable instructions, data structures, program modules and other data for computer 130. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 144, magnetic disk 148, optical disk 152, ROM 138, or RAM 140, including an operating system 158, one or more application programs 160, other program modules 162, and program data 164. A user may enter commands and information into computer 130 through input devices such as a keyboard 166 and a pointing device 168. Other input devices (not shown) may include a microphone, joystick, game pad, satellite dish, scanner, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computer 130 commonly operates in a networked environment using logical connections to one or more remote computers, such as a remote computer 176. The remote computer 176 may be another personal computer, a server, a router, a network PC, a peer device or other common network node, and typically includes many or all of the elements described above relative to computer 130, although only a memory storage device 178 has been illustrated in FIG. 2. The logical connections depicted in FIG. 2 include a local area network (LAN) 180 and a wide area network (WAN) 182. Such networking environments are commonplace in offices, enterprise-wide computer networks, intranets, and the Internet.

When used in a LAN networking environment, computer 130 is connected to the local network 180 through a network interface or adapter 184. When used in a WAN networking environment, computer 130 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 130, or portions thereof, may be stored in the remote memory storage device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

Prior to executing the authentication process described below, both the user of client computer system 100 and the operator of affiliate server 104 "register" with the authentication server 110. This registration is a one-time process which provides necessary information to the authentication server. The user of client computer system 100 registers by providing the user's name, mailing address, email address, and various other information about the user or the client computer system. As part of the user registration process, the user is assigned (or selects) a login ID, which is a common login ID used to access any affiliate server. The login ID may also be referred to herein as a "user name" or "login name". Additionally, the user selects a password associated with the login ID which is used for authentication purposes. After registering and logging into the authentication server, the user can visit any affiliate server (i.e., affiliate servers that are also registered with the same authentication server) without requiring any additional authentication and without re-entering user information that is already contained in the user profile.

The operator of affiliate server 104 registers with the authentication server 110 by providing information about the affiliate server (e.g., server name and internet address). Additionally, the affiliate server provides information regarding its authentication requirements. The authentication requirements can be specified as the maximum time allowed since the last login and entry of authentication information by the user as well as the maximum time allowed since the last "refresh" of the authentication information by the user. Refreshing the authentication information refers to the process of having the user re-enter the password to be certain that the appropriate user is still operating the client computer system. This periodic refreshing of authentication information is useful if the user leaves their computer system without logging out of the authentication server, thereby allowing another individual to access affiliate servers using the login ID of the previous user. If a user requests access to the affiliate server after the maximum time allowed, then the user is re-authenticated (i.e., refreshed) by the authentication server. Thus, although there is a central authentication server, each individual affiliate server can establish its own authentication requirements which are enforced by the authentication server. After registering with the authentication server, the affiliate server can use the authentication server to authenticate any user that has also registered with the authentication server.

Figure 3:
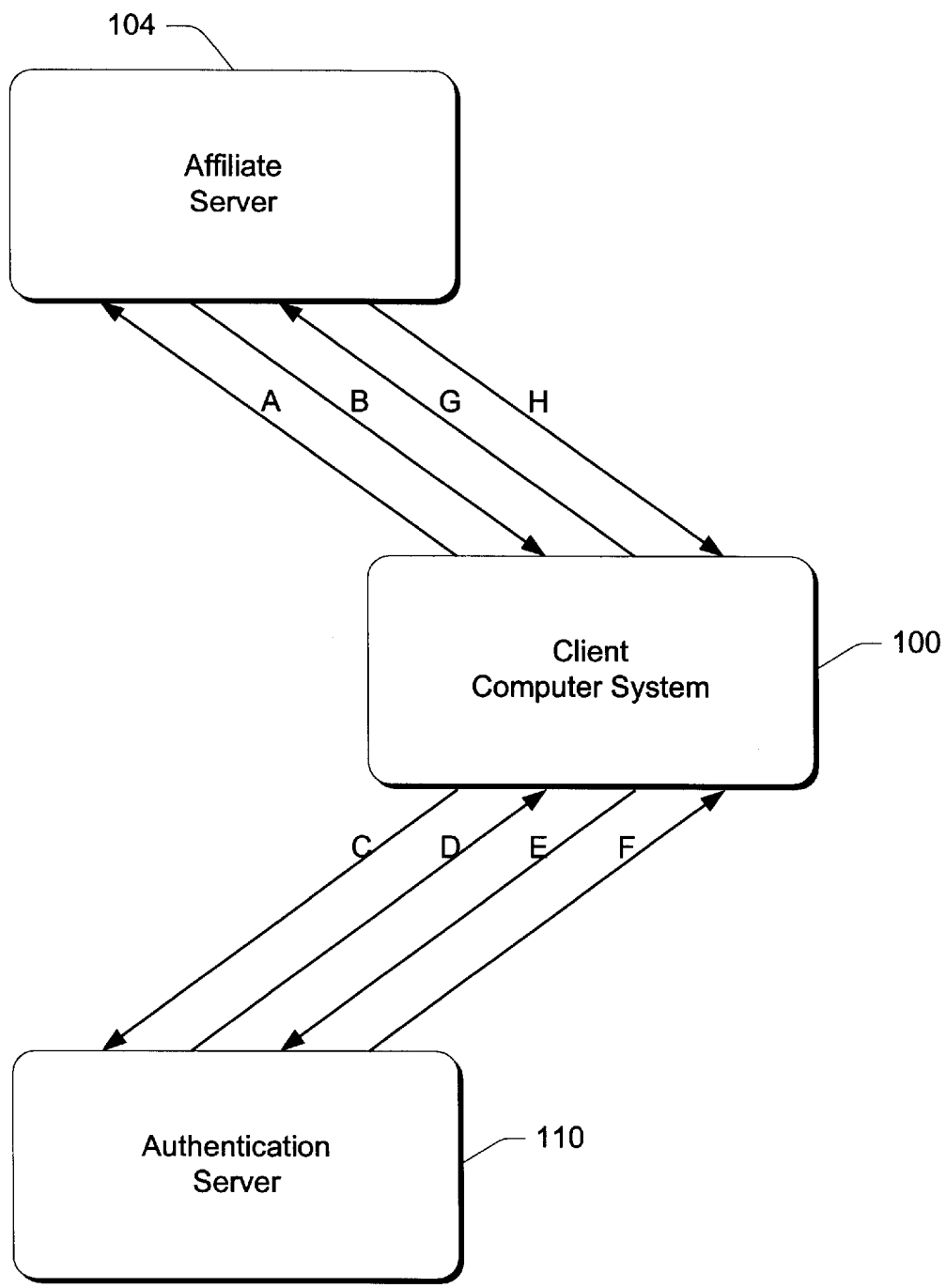
FIGS. 3 and 4 illustrate the interaction between the client computer system, a particular affiliate server and the authentication server when a user of the client computer system seeks access to the affiliate server.
Figure 4:
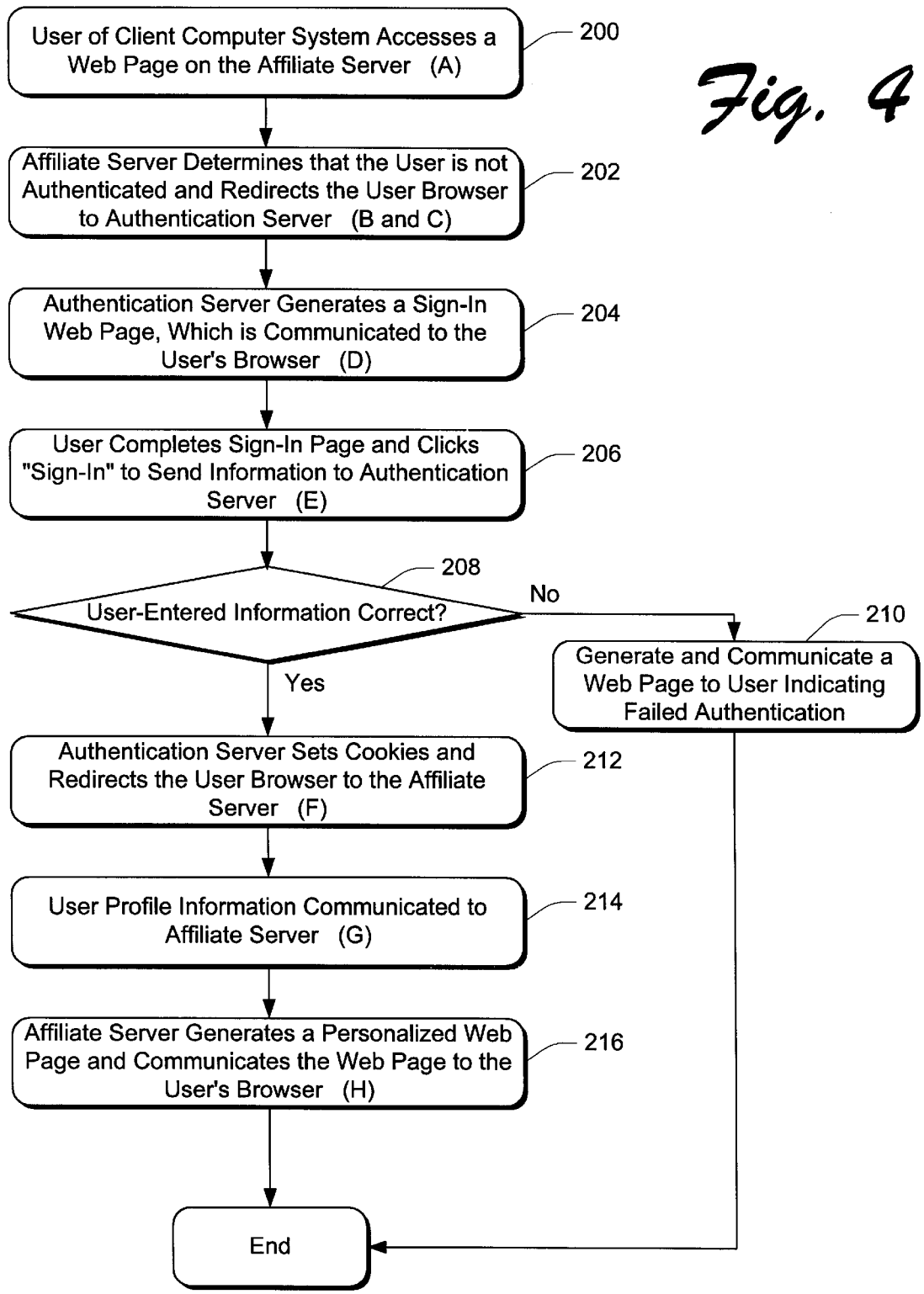

FIGS. 3 and 4 illustrate the interaction between the client computer system 100, the affiliate server 104, and the authentication server 110 when a user of the client computer system seeks access to the affiliate server. The example illustrated with respect to FIGS. 3 and 4 describes the situation in which the user of the client computer system 100 has not yet logged into the affiliate server 104 and has not yet been authenticated by the authentication server 110. The lines in FIG. 3 labeled "A" through "H" represent the flow of information or activities during the authentication process. The arrows on the lines indicate the direction of the process flow. The label "A" represents the beginning of the process and the label "H" represents the end of the process. The corresponding steps in FIG. 4 are indicated with the label in parenthesis.

FIG. 4 is a flow diagram illustrating the authentication process when a user of the client computer system 100 seeks access to the affiliate server 104. The process begins when the user of the client computer system accesses a web page on the affiliate server (step 200). The client computer system includes a web browser, such as the "Internet Explorer" web browser manufactured and distributed by Microsoft Corporation of Redmond, Washington, for accessing various web sites. The affiliate server determines whether the user seeking access to the server is already logged into the affiliate server (e.g., authenticated) at step 202. In this example, the user is not logged into the affiliate server, so the user must be authenticated before the affiliate server will allow access. To authenticate the user, the affiliate server redirects the user's browser to the authentication server.

In this example, the user has not yet logged into the authentication server. Thus, the authentication server generates a sign-in web page and communicates the web page to the client computer system for display on the user's browser (step 204). The sign-in web page requests the user's login ID and password, which were established when the user registered with the authentication server. The user fills-in the requested information on the sign-in web page and clicks a "sign-in" button on the web page to send the information entered to the authentication server (step 206).

Upon receiving the information from the user of the client computer system, the authentication server compares the entered information with the information stored in the authentication database (step 208). If the user-entered information is not correct (i.e., does not match the information stored in the authentication database) then the authentication server generates and communicates a web page to the user indicating the login ID and password combination were not valid (step 210). The web page may give the user an opportunity to re-enter the login ID and password by returning to step 204. Confidential information (such as the login ID and password) is communicated using a secure protocol such as SSL (secure sockets layer). Various other secure protocols or encryption mechanisms can be used to communicate confidential information between the authentication server and the client computer system.

If the user-entered information is correct (i.e., matches the information stored in the authentication database) then the authentication server copies the appropriate cookies to the client computer system and redirects the user's browser to the affiliate server (step 212). A "cookie" is a piece of data provided to a web browser by a web server. The data (i.e., cookie) is sent back to the web server by the web browser during subsequent accesses to the web server. With respect to step 212, one cookie contains information regarding the date and time that the user was authenticated by the authentication server. Another cookie contains information regarding the user profile. The authentication server also updates (or creates) a cookie that contains a list of all sites (or web servers) visited by the user since the last logout from the authentication server. The cookie is updated by adding the current affiliate server to the list of sites visited. This list of sites visited is used to remove cookies from the client computer system when the user logs out of the authentication server. For example, when the user logs out, the authentication server sends a message to each web server on the list of sites visited. Each message is a request for the web server to delete any cookies it placed on the client computer system (e.g., through a browser running on the client computer system).

Cookies written to the client computer system by the authentication server cannot be read by any affiliate server. Similarly, cookies written to the client computer system by a particular affiliate server cannot be read by any other affiliate server. The cookies written by an affiliate server are encrypted using a key that is unique to the affiliate server, thereby preventing other affiliate servers from reading the data stored in the cookies.

The authentication server also communicates the user profile information to the affiliate server (step 214) through the client computer system. In a particular embodiment of the invention, the user of the client computer system can specify, during the registration process what types of profile information should be provided to various types of web servers. For example, a user may specify that all commerce-related web servers should receive the user's mailing address, but restrict the mailing address from all other types of web sites.

After receiving the user's profile information, the affiliate server generates a personalized web page for the user and communicates the web page to the user's browser (step 216). Additionally, the affiliate server copies one or more cookies to the client computer system which include information indicating that the user of the client computer system has been authenticated and indicating the period of time during which the authentication is valid. Each time the user enters a new web page request on the same affiliate server, the data in the cookie is copied to the affiliate server along with the page request. Thus, the affiliate server will not repeatedly check the authentication of a user during each subsequent page request. However, if a particular period of time has passed (referred to as a timeout period) since the last authentication process by the authentication server, then the affiliate server may request a re-authorization of the user. In this situation, the user is asked to refresh their authorization by re-entering their login ID and password. If the entered information is valid, then the timeout period is reset and the existing cookie is replaced with a new cookie containing the new timeout information.

If the user of the client computer system is new to the affiliate server, the affiliate server may request additional user information that is not already contained in the user profile. The additional information may include information unique to that site (e.g., account number) or information about the user's preferences and how the user intends to use the web site. Thus, although the user generates a user profile that is stored on the authentication server, the user may be required, during an initial visit to a web site, to provide additional information for the benefit of the associated web server. This additional information is then stored by the affiliate server such that the user will not be required to re-enter the data during subsequent visits to the same web site.

Although affiliate server 104 and authentication server 110 are both coupled to network 102 (see FIG. 1), no direct connections are shown in FIG. 3. In this embodiment of the invention, the affiliate server 104 and the authentication server 110 do not communicate directly with one another. Instead, communications between the affiliate server and the authentication server pass through the client computer system. However, in an alternate embodiment of the invention, affiliate server 104 communicates directly with authentication server 110, using network 102 or another data communication medium. Thus, rather than communicating through client computer system 100, the communications flow directly between the authentication server and the affiliate server. Although the authentication server and the affiliate server communicate directly, the user's authentication information (e.g., password) is not exposed to the affiliate server.

After a user has logged into the authentication server, it is not necessary to re-enter the login ID, password, or other user information when accessing other affiliated web servers. The subsequent affiliate web servers accessed will determine from the authentication server that the user is already authenticated.

Figure 5:
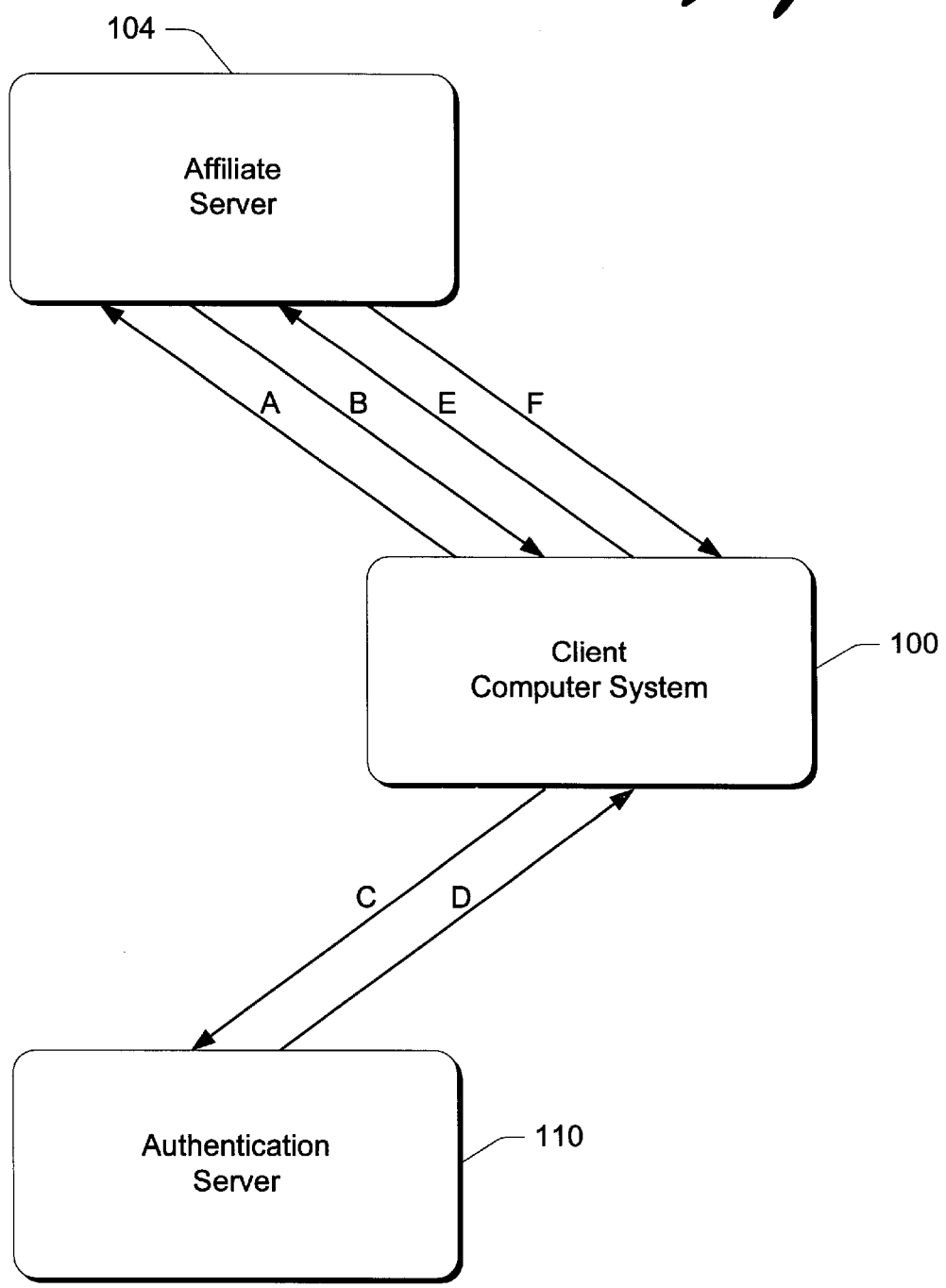

FIGS. 5 and 6 illustrate the interaction between the client computer system, a particular affiliate server and the authentication server in a different situation. The example illustrated with respect to FIGS. 5 and 6 describes the situation in which the client computer system 100 has already been authenticated by the authentication server 110 (e.g., when logging into a different affiliate server), but the client computer system is not yet logged into the affiliate server 104.

In this example, the user of the client computer system 100 accesses a web page on the affiliate server 104 (step 230). The affiliate server determines that the user is not authenticated (with respect to the affiliate server) and redirects the user's browser to the authentication server (step 232). Next, the authentication server retrieves the affiliate information entered during registration of the affiliate to determine whether the most recent authentication of the user is within the affiliate's timeout period (step 234). If the most recent authentication is not within the timeout period (i.e., not acceptable), then the authentication server retrieves and authenticates the user's login ID and password (step 238) using, for example, the procedures discussed above with respect to FIG. 4.

If the most recent authentication is acceptable, then the authentication server copies the appropriate cookies to the client computer system and redirects the user's browser back to the affiliate server (step 240). The authentication server also copies certain elements of the user's profile information to the affiliate server (step 242). The affiliate server then generates a personalized web page and communicates the web page to the user's browser (step 244). The affiliate server also copies a cookie to the client computer system containing information indicating that the user of the client computer system has been authenticated and indicating the period of time during which the authentication is valid. Each time the user enters a new web page request on the same affiliate server, the data in the cookie is copied to the affiliate server along with the page request. Thus, the affiliate server will not repeatedly check the authentication of a user during each subsequent page request.

In an embodiment of the invention, a particular affiliate server may utilize only a portion of the services available from the authentication server. For example, the affiliate server may perform its own authentication of the user, but requests the user profile information from the authentication server. In another example, the affiliate server may rely on the authentication server to authenticate the user, but the affiliate server ignores the user profile information and, instead, collects information from the user itself.

In one embodiment of the invention, the same login ID is used to identify a particular user on all affiliate servers. However, this configuration presents a situation in which affiliate servers could exchange information collected about the user with other affiliate servers, relying on the common login ID. To avoid this situation, a second embodiment of the invention uses a different login ID for each of the affiliate servers. This use of different login IDs is transparent to the user, who only knows of the login ID used to log into the authentication server. The authorization server maintains a list or cross-reference table that correlates the user's login ID on the different affiliate servers. In this embodiment, the affiliate servers do not know the login ID used on other affiliate servers for the same user. and, therefore, cannot exchange information about the user with other affiliate servers.

A particular embodiment of the invention has been described and illustrated herein with reference to multiple web servers and an authentication server coupled to a common data communication network. However, the teachings of the present invention can be applied to any type of web server or other computing device that accesses a centralized authentication system to authenticate a user and retrieve associated user profile information. Furthermore, the present invention can be utilized without requiring a data communication network. Instead, one or more temporary or permanent data communication links are established between an authentication server and an affiliate server for exchanging data.

Thus, a system has been described that allows a web server to authenticate a user seeking access to the web server. The authentication is performed by an authentication server without exposing the user's authentication information (e.g., password) to the web server. The web server receives a message from the authentication server indicating whether the authentication was successful. The authentication server may also provide user profile information to the web server if the user is authenticated. Thus, the authentication server provides a centralized device for authenticating users and maintaining the user's profile information. This single user profile may be provided to multiple affiliate servers without. requiring repeated entry of information by the user (i.e., entering user information at each new web site visited). Once the user has been authenticated by the authentication server, the user can visit multiple web sites that are affiliated with the authentication server without re-entering the authentication information for each web site.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method of granting access to a network server, the method comprising:

receiving, at an authentication server, a request to authenticate a user, wherein the request is generated by the network server to which the user is attempting to gain access;

determining whether the user was already authenticated by the authentication server;

if the user was already authenticated by the authentication server, notifying the network server that the user is authenticated; and if the user was not already authenticated by the authentication server, then retrieving login information from the user, wherein the login information is not communicated through the network server, authenticating the user by comparing the retrieved login information with authentication information maintained by the authentication server, notifying the network server that the user is authenticated if the retrieved login information matches the authentication information.

2. A method as recited in claim 1 wherein the network server is a web server coupled to the Internet.

3. A method as recited in claim 1 wherein the method is performed by the authentication server, which is coupled to the Internet.

4. A method as recited in claim 1 wherein the retrieved login information includes a login ID and a password associated with the login ID.

5. A method as recited in claim 1 wherein the notifying includes:

determining an elapsed time since the last authentication of the user; and refreshing the authentication of the user if the elapsed time since the last authentication of the user exceeds a timeout period identified by the network server.

6. A method as recited in claim 1 further comprising concealing the retrieved login information from the network server.

7. A method as recited in claim 1 further comprising concealing the authentication information maintained by the authentication server from the network server.

8. A method as recited in claim 1 wherein the notifying further includes communicating a user profile to the network server by way of data passed through the user device.

9. A method as recited in claim 1 wherein the notifying further includes:

identifying elements of a user profile to be provided to the network server; and communicating the identified elements of the user profile to the network server by way of data passed through the user device.

10. A method as recited in claim 1 wherein the notifying further includes:

identifying particular elements of a user profile to be provided to the network server, wherein the identified elements are selected by the user and maintained by the authentication server; and communicating the identified elements of the user profile to the network server.

11. A method as recited in claim 1 further including providing a cookie to an Internet browser operated by the user if the retrieved login information matches the authentication information, wherein the cookie contains user profile information.

12. A method as recited in claim 1 further including providing a cookie to an Internet browser operated by the user if the retrieved login information matches the authentication information, wherein the cookie contains user authentication information.

13. A method as recited in claim 1 further including providing a cookie to an Internet browser operated by the user if the retrieved login information matches the authentication information, wherein the cookie contains a list of network servers previously visited by the user.

14. A method as recited in claim 1 wherein the user previously registered with the authentication server.

15. A method as recited in claim 1 wherein the network server previously registered with the authentication server.

16. One or more computer-readable memories containing a computer program that is executable by a processor to perform the method recited in claim 1.

17. A method of accessing a web server, the method comprising:

receiving a request to authenticate a user, wherein the request is generated by the web server to which the user is attempting to gain access;

determining whether the user was already authenticated by an authentication server;

if the user was already authenticated by the authentication server, notifying the web server that the user is authenticated and communicating a user profile to the web server; and if the user was not already authenticated by the authentication server, then retrieving login information directly from the user, wherein the login information is not communicated through the web server;

authenticating the user by comparing the retrieved login information with authentication information maintained by the authentication server; and if the retrieved login information matches the authentication information, notifying the web server that the user is authenticated and communicating the user profile to the web server.

18. A method as recited in claim 17 wherein the notifying includes:

determining an elapsed time since the last authentication of the user; and refreshing the authentication of the user if the elapsed time since the last authentication of the user exceeds a timeout period identified by the web server.

19. A method as recited in claim 17 further including concealing the retrieved login information from the web server.

20. A method as recited in claim 17 further including concealing the authentication information maintained by the authentication server from the web server.

21. A method as recited in claim 17 further including providing a cookie to an Internet browser operated by the user if the retrieved login information matches the authentication information, wherein the cookie contains user authentication information.

22. A method as recited in claim 17 further including providing a cookie to an Internet browser operated by the user if the retrieved login information matches the authentication information, wherein the cookie contains user profile information.

23. A method as recited in claim 17 wherein the user determines which elements of the user profile are communicated to the web server.

24. A method as recited in claim 17 wherein the user previously registered with the authentication server.

25. A method as recited in claim 17 wherein the web server previously registered with the authentication server.

26. One or more computer-readable memories containing a computer program that is executable by a processor to perform the method recited in claim 17.

27. A method of distributing information, the method comprising:

receiving a request for information relating to a user, wherein the request is generated by a network server to which the user is attempting to gain access, and wherein the request is received by an authentication server;

determining whether the user was already authenticated by the authentication server;

if the user was already authenticated by the authentication server, providing user profile information to the network server; and if the user was not already authenticated by the authentication server, then retrieving login information from the user, wherein the login information is not communicated through the network server, authenticating the user by comparing the retrieved login information with authentication information maintained by the authentication server, providing user profile information to the network server if the retrieved login information matches the authentication information.

28. A method as recited in claim 27 wherein the providing of user profile information to the network server includes:

identifying elements of a user profile to be provided to the network server; and communicating the identified elements of the user profile to the network server.

29. A method as recited in claim 27 wherein the providing of user profile information to the network server includes:

identifying particular elements of a user profile to be provided to the network server, wherein the identified elements are selected by the user and maintained by the authentication server; and communicating the identified elements of the user profile to the network server.

30. A method as recited in claim 27 wherein the providing of user profile information to the network server further includes notifying the network server that the user is authenticated.

31. One or more computer-readable media having stored thereon a computer program comprising the following steps:

receiving a request to authenticate a user seeking access to a network server;

determining whether the user was already authenticated by an authentication server;

if the user was already authenticated by the authentication server, notifying the network server that the user is authenticated; and if the user was not already authenticated by the authentication server, then retrieving login information from the user, wherein the login information is not communicated through the network server, authenticating the user by comparing the retrieved login information with authentication information maintained by the authentication server, notifying the network server that the user is authenticated if the retrieved login information matches the authentication information, and notifying the network server that the user is not authenticated if the retrieved login information does not match the authentication information.

32. One or more computer-readable media as recited in claim 31 further including concealing the retrieved login information from the network server.

33. One or more computer-readable media as recited in claim 31 wherein the notifying further includes communicating a user profile to the network server by way of data passed through the user device.

34. One or more computer-readable media as recited in claim 31 further including providing a cookie to an Internet browser operated by the user if the retrieved login information matches the authentication information, wherein the cookie contains user profile information.

35. One or more computer-readable media as recited in claim 31 further including providing a cookie to an Internet browser operated by the user if the retrieved login information matches the authentication information, wherein the cookie contains user authentication information.

36. An apparatus comprising:

an authentication server coupled to a data communication network;

an authentication database coupled to the authentication server;

wherein the authentication server is configured to receive a request to authenticate a user requesting access to a network server coupled to the data communication network and to determine whether the user was already authenticated by the authentication server so that if the user was already authenticated by the authentication server, then the authentication server sends a notification to the network server that the user is authenticated, and if the user was not already authenticated by the authentication server, then the authentication server retrieves login information from the user, authenticates the user by comparing the retrieved login information with authentication information stored in the authentication database, and sends a notification to the network server that the user is authenticated if the retrieved login information matches the authentication information stored in the authentication database, wherein the login information is not communicated through the network server.

37. An apparatus as recited in claim 36 wherein the network server is a web server and the data communication network is the Internet.

38. An apparatus as recited in claim 36 wherein the network server is registered with the authentication server.

39. An apparatus as recited in claim 36 wherein the user is registered with the authentication server.

40. An apparatus as recited in claim 36 wherein the user operates an Internet browser configured to communicate on the data communication network.

41. A method of accessing multiple network servers, the method comprising:

accessing a first network server, wherein the first network server authenticates a user requesting access by communicating an authentication request to an authentication server;

receiving a request for login information from the authentication server;

providing the requested login information to the authentication server, wherein the login information is not communicated through the first network server;

receiving an acknowledgement granting access to the first network server;

accessing a second network server, wherein the second network server authenticates the user requesting access by communicating an authentication request to the authentication server; and receiving an acknowledgement granting access to the second network server.

42. A method as recited in claim 41 wherein the first network server and the second network server are web servers.

43. A method as recited in claim 41 wherein the first network server and the second network server previously registered with the authentication server.

44. A method as recited in claim 41 wherein the user previously registered with the authentication server.

45. A method as recited in claim 41 wherein the requested login information includes a login ID and a password associated with the login ID.

46. One or more computer-readable memories containing a computer program that is executable by a processor to perform the method recited in claim 41.

47. A method of accessing a web server coupled to the Internet, the method comprising:

receiving a request to authenticate a user of an Internet browser seeking access to the web server, wherein the request is received from the web server;

determining whether the user was already authenticated by an authentication server;

if the user was already authenticated by the authentication server, notifying the web server that the user is authenticated, wherein the web server grants access to the user;

if the user was not already authenticated by the authentication server, then communicating a web page directly to the user's Internet browser without communicating through the web server, wherein the web page requests login information from the user;

receiving the completed web page directly from the user without communicating through the web server;

authenticating the user by comparing the information received in the completed web page with authentication information maintained by the authentication server; and if the information received in the completed web page matches the authentication information, notifying the web server that the user is authenticated.

48. A method as recited in claim 47 wherein the notifying includes:

determining an elapsed time since the last authentication of the user; and refreshing the authentication of the user if the elapsed time since the last authentication of the user exceeds a timeout period identified by the web server.

49. A method as recited in claim 47 further including concealing the information received in the completed web page from the web server.

50. A method as recited in claim 47 further including concealing the authentication information maintained by the authentication server from the web server.

51. A method as recited in claim 47 further including providing a cookie to the user's Internet browser if the information received in the completed web page matches the authentication information, wherein the cookie contains user authentication information.

52. A method as recited in claim 47 further including providing a cookie to the user's Internet browser if the information received in the completed web page matches the authentication information, wherein the cookie contains user profile information.

53. A method as recited in claim 47 further including providing a user profile to the web server if the information received in the completed web page matches the authentication information.

54. One or more computer-readable memories containing a computer program that is executable by a processor to perform the method recited in claim 47.

* * * * *

UNITED STATES PATENT AND TRADEMARK OFFICE
CERTIFICATE OF CORRECTION

PATENT NO. : 6,584,505 B1
DATED : June 24, 2003
INVENTOR(S) : Howard et al.

It is certified that error appears in the above-identified patent and that said Letters Patent is hereby corrected as shown below:

Column 2,
Line 7, replace "bmith," with -- bsmith, --.

Signed and Sealed this

Thirtieth Day of September, 2003

JAMES E. ROGAN
*Director of the United States Patent and Trademark Office*